Patented Aug. 28, 1945

2,383,510

UNITED STATES PATENT OFFICE 2,383,510

MINERAL OIL COMPOSITION

Horace E. Redman, Wenonah, and Everett W. Fuller, Woodbury, N. J., assignors to Socony-Vacuum Oil Company, Incorporated, a corporation of New York No Drawing. Application May 29, 1943,
Serial No. 489,098

16 Claims. (Cl. 252—48)

This invention has to do with the stabilization of petroleum products against the deleterious effects of oxidation and deterioration with use. More specifically, it has to do with the improvement or stabilization of mineral oil fractions, particularly viscous mineral oils, by the use of novel reaction products, or a novel class of reaction products, which when admixed with a mineral oil fraction in minor proportions will prevent or delay undesirable changes taking place in the oil.

It is well known to those familiar with the art that substantially all of the various fractions obtained from mineral oils and refined for their numerous uses are susceptible to oxidation. This susceptibility of an oil fraction to oxidation and the manner in which oxidation manifests itself within the oil varies with the type and degree of refinement to which the oil has been subjected and with the conditions under which the oil is used or tested. In other words, the deleterious products formed in an oil fraction as a result of oxidation and the degree to which they are formed depends upon the extent to which the various unstable constituents, which may act as oxidation catalysts, have been removed by refining operations, and also upon the conditions of use.

A large number of compounds and compositions have been proposed for use as improving or stabilizing agents for petroleum products. For example, various compounds or reaction products containing metalloids or metals, or combinations of one or more of such elements, have been credited with improving petroleum products in certain respects.

This invention relates to metal salts of phosphorus- and sulfur-containing reaction products possessed of the capacity to effect a high degree of improvement of mineral oil fractions. More particularly, the present invention is predicated upon the discovery of a new and novel class of oil-soluble metal salts of acidic, phosphorus- and sulfur-containing reaction products obtained by reaction of one mol of phosphorus pentasulfide ($P_2S_5$) and about four mols of a saturated aliphatic ketone. Preferred of such salts are those in which said acidic reaction products were prepared by using a temperature above about 90° C., and particularly preferred are those prepared by using a temperature from about 90° C. to about 105° C. This preference is influenced largely by the fact that the aforesaid reaction of said ketone and $P_2S_5$ is very slow at temperatures below about 90° C. and is rapid at temperatures above about 105° C., with the formation of undesirable insoluble products in same cases.

Although the exact chemical structure of the reaction products obtained in the aforesaid reaction of said ketone and $P_2S_5$ is unknown at this time, our investigations have shown that such reaction products are acidic in nature, as indicated by their neutralization numbers (N. N.) and their ability to form metal salts, and contain appreciable amounts of both phosphorus and sulfur. These reaction products are believed to be new inasmuch as previous disclosures have shown that compounds containing sulfur, not phosphorus and sulfur, are formed in the reaction of $P_2S_5$ with certain ketones. More specifically, Spring, in the Bull. Chim. (France) 2, 40, 67 has disclosed that a dimer thioketone, $C_6H_{12}S_2$, was obtained by reacting acetone with $P_2S_5$; and Gatterman, in the Ber. 28, 2877, has disclosed that thiobenzophenone was obtained by reacting benzophenone in benzene solution with $P_2S_5$ for several hours at 130° C. in a bomb. Also Kretov and Komissarov in J. Gen. Chem. (U. S. S. R.) 5, 388 (CA 29, 6207) have reported that mixtures of powdered $P_2S_5$ and various ketones such as acetone, methyl ethyl ketone, diethyl ketone, etc. when heated for 8 hours on a water bath gave small yields of the corresponding thioketone and their polymers. It would appear, then, that the reaction products from which the metal salts of this invention are prepared, are novel, and, consequently, that said metal salts are novel.

The saturated aliphatic ketones which are reacted with $P_2S_5$ to provide the aforesaid acidic reaction products are represented by the general formula:

wherein R and R' are saturated aliphatic groups, and may be the same or different groups. Illustrative of this class of ketones are di-isobutyl ketone, n-propyl methyl ketone, isobutyl methyl ketone, n-amyl methyl ketone, di-octyl ketone, di-dodecyl ketone, di-octadecyl ketone, methyl octadecyl ketone, etc. Those ketones which are particularly preferred herein are the ketones with aliphatic groups that are sufficiently long to impart oil solubility to the final reaction product, such as amyl methyl ketone, di-isobutyl ketone, isobutyl methyl ketone and propyl methyl ketone.

The metal salts of this invention are formed making the oil addition agents contemplated herein and have referred to certain specific metal salts and reaction products and specific mineral oils, the invention is not limited to these specific features of the description but includes variations of the procedures which will be apparent to those skilled in the art and other typical metal salts and reaction products and petroleum products coming within the scope of the appended claims.

We claim:

1. An improved mineral oil composition comprising a viscous mineral oil and in admixture therewith a minor proportion, sufficient to stabilize said oil against oxidation, of a salt of an acidic, phosphorus- and sulfur-containing reaction product obtained by reaction, at a temperature above about 90° C., of substantially one mol of P₂S₅ and four mols of a saturated aliphatic ketone having the general formula:

$$R-\underset{\underset{O}{\|}}{C}-R'$$

wherein R and R' are saturated aliphatic groups, said salt being selected from the group consisting of metal, ammonium and organic amine salts.

2. An improved mineral oil composition comprising a viscous mineral oil and in admixture therewith a minor proportion, sufficient to stabilize said oil against oxidation, of a salt of an acidic, phosphorus- and sulfur-containing reaction product obtained by reaction at a temperature between about 90° C. and about 105° C. of substantially one mol of P₂S₅ and four mols of a saturated aliphatic ketone having the general formula:

$$R-\underset{\underset{O}{\|}}{C}-R'$$

wherein R and R' are saturated aliphatic groups, said salt being selected from the group consisting of metal, ammonium, and organic amine salts.

3. An improved mineral oil composition comprising a viscous mineral oil and in admixture therewith a minor proportion, sufficient to stabilize said oil against oxidation, of a metal salt of an acidic, phosphorus- and sulfur-containing reaction product obtained by reaction, at a temperature above about 90° C., of substantially one mol of P₂S₅ and four mols of a saturated aliphatic ketone having the general formula:

$$R-\underset{\underset{O}{\|}}{C}-R'$$

wherein R and R' are saturated aliphatic groups.

4. An improved mineral oil composition comprising a viscous mineral oil and in admixture therewith a minor proportion, from about 0.10 per cent to about 2 per cent, of a metal salt of an acidic, phosphorus- and sulfur-containing reaction product obtained by reaction, at a temperature above about 90° C., of substantially one mol of P₂S₅ and four mols of a saturated aliphatic ketone having the general formula:

$$R-\underset{\underset{O}{\|}}{C}-R'$$

wherein R and R' are saturated aliphatic groups.

5. An improved mineral oil composition comprising a viscous mineral oil and in admixture therewith a minor proportion, sufficient to stabilize said oil against oxidation, of a metal salt of an acidic, phosphorus- and sulfur-containing reaction product obtained by reaction, at a temperature above about 90° C., of substantially one mole of P₂S₅ and four mols of a saturated aliphatic ketone having the general formula:

$$R-\underset{\underset{O}{\|}}{C}-R'$$

wherein R and R' are the same saturated aliphatic groups.

6. An improved mineral oil composition comprising a viscous mineral oil and in admixture therewith a minor proportion, sufficient to stabilize said oil against oxidation, of a metal salt of an acidic, phosphorus- and sulfur-containing reaction product obtained by reaction, at a temperature above about 90° C., of substantially one mol of P₂S₅ and four mols of a saturated aliphatic ketone having the general formula:

$$R-\underset{\underset{O}{\|}}{C}-R'$$

wherein R and R' are different saturated aliphatic groups.

7. An improved mineral oil composition comprising a viscous mineral oil and in admixture therewith a minor proportion, sufficient to stabilize said oil against oxidation, of a metal salt of an acidic, phosphorus- and sulfur-containing reaction product obtained by reaction, at a temperature between about 90° C. and about 105° C., of substantially one mole of P₂S₅ and four mols of a saturated aliphatic ketone having the general formula:

$$R-\underset{\underset{O}{\|}}{C}-R'$$

wherein R and R' are saturated aliphatic groups.

8. An improved mineral oil composition comprising a viscous mineral oil and in admixture therewith of a minor proportion, sufficient to stabilize said oil against oxidation, of a metal salt of an acidic, phosphorus- and sulfur-containing reaction product obtained by reaction, at a temperature above about 90° C., of substantially one mol of P₂S₅ and four mols of a saturated aliphatic ketone in the presence of a substantially inert diluent, said ketone having the general formula:

$$R-\underset{\underset{O}{\|}}{C}-R'$$

wherein R and R' are saturated aliphatic groups.

9. An improved mineral oil composition comprising a viscous mineral oil and in admixture therewith a minor proportion, sufficient to stabilize said oil against oxidation, of a metal salt of an acidic, phosphorus- and sulfur-containing reaction product obtained by reaction, at a temperature above about 90° C., of substantially one mol of P₂S₅ and four mols of a saturated aliphatic ketone having the general formula:

$$R-\underset{\underset{O}{\|}}{C}-R'$$

wherein R and R' are saturated aliphatic groups, said metal salt being selected from the group consisting of barium, calcium, and zinc salts.

10. An improved mineral oil composition comprising a viscous mineral oil and in admixture therewith a minor proportion, sufficient to stabilize said oil against oxidation, of the barium salt of the acidic, phosphorus- and sulfur-containing reaction product obtained by reaction, at a temperature between about 90° C. and about 105° C., of substantially one mol of P₂S₅ and four mols of amyl methyl ketone.

11. An improved mineral oil composition comprising a viscous mineral oil and in admixture therewith a minor proportion, sufficient to stabilize said oil against oxidation, of the barium salt of the acidic, phosphorus- and sulfur-containing reaction product obtained by reaction, at a temperature between about 90° C. and about 105° C., of substantially one mol of $P_2S_5$ and four mols of di-isobutyl ketone.

12. An improved mineral oil composition comprising a viscous mineral oil and in admixture therewith a minor proportion, sufficient to stabilize said oil against oxidation, of the barium salt of the acidic, phosphorus- and sulfur-containing reaction product obtained by reaction, at a temperature between about 90° C. and about 105° C., of substantially one mol of $P_2S_5$ and four mols of propyl methyl ketone.

13. A mineral oil concentrate containing a salt of an acidic, phosphorus- and sulfur-containing reaction product, said concentrate being obtained by reacting substantially one mol of phosphorus pentasulfide with four mols of a saturated aliphatic ketone, at a temperature above about 90° C., in the presence of a substantially inert mineral oil and substituting the phosphorus pentasulfide reaction mixture so obtained with a salt group, said saturated aliphatic ketone having the general formula:

wherein R and R' are saturated aliphatic groups, said salt is selected from the group consisting of metal, ammonium and organic amine salts, and said salt group is selected from the group consisting of metal, ammonium and organic amine groups.

14. A mineral oil concentrate containing a salt of an acidic, phosphorus- and sulfur-containing reaction product, said concentrate being obtained by reacting substantially one mol of phosphorus pentasulfide with four mols of a saturated aliphatic ketone, at a temperature between about 90° C. and about 105° C., in the presence of a substantially inert mineral oil and substituting the phosphorus pentasulfide reaction mixture so obtained with a salt group, said saturated aliphatic ketone having the general formula:

wherein R and R' are saturated aliphatic groups, said salt is selected from the group consisting of metal, ammonium and organic amine salts, and said salt group is selected from the group consisting of metal, ammonium and organic amine groups.

15. A mineral oil concentrate containing a metal salt of an acidic, phosphorus- and sulfur-containing reaction product, said concentrate being obtained by reacting substantially one mol of phosphorus pentasulfide with four mols of a saturated aliphatic ketone, at a temperature above about 90° C., in the presence of a substantially inert mineral oil and substituting the phosphorus pentasulfide reaction mixture so obtained with metal, said saturated aliphatic ketone having the general formula:

wherein R and R' are saturated aliphatic groups.

16. A mineral oil concentrate containing a metal salt of an acidic, phosphorus- and sulfur-containing reaction product, said concentrate being obtained by reacting substantially one mol of phosphorus pentasulfide with four mols of a saturated aliphatic ketone, at a temperature between about 90° C. and about 105° C., in the presence of a substantially inert mineral oil and substituting the phosphorus pentasulfide reaction mixture so obtained with metal, said saturated aliphatic ketone having the general formula:

wherein R and R' are saturated aliphatic groups.

HORACE E. REDMAN.
EVERETT W. FULLER.

Aug. 28, 1945. R. S. REYNOLDS 2,383,511
COMPOSITE ALUMINUM-ALLOY SHEETS AND METHOD OF MAKING SAME
Filed Nov. 1, 1941
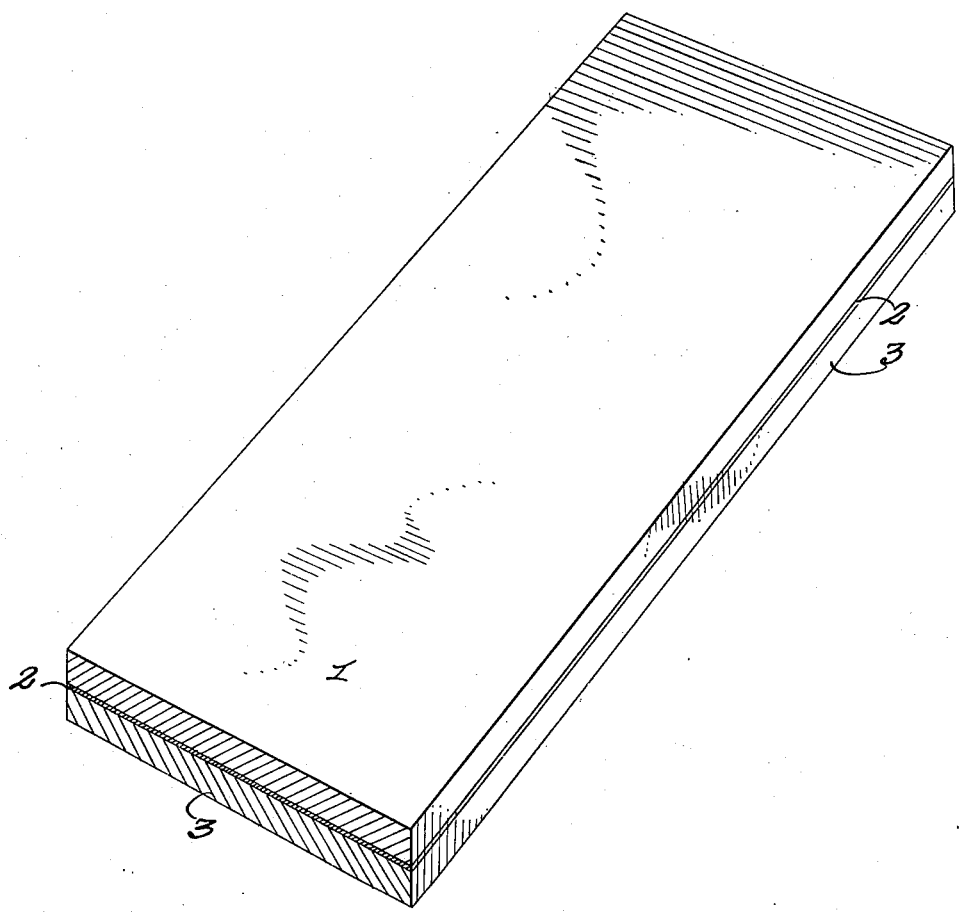
INVENTOR.
RICHARD S. REYNOLDS
BY